(12) United States Patent
Tam

(10) Patent No.: US 11,108,486 B2
(45) Date of Patent: Aug. 31, 2021

(54) TIMING IMPROVEMENT FOR COGNITIVE LOUDSPEAKER SYSTEM

(71) Applicant: Kit S. Tam, Menlo Park, CA (US)

(72) Inventor: Kit S. Tam, Menlo Park, CA (US)

(*) Notice: Subject to any disclaimer, the term of this patent is extended or adjusted under 35 U.S.C. 154(b) by 105 days.

(21) Appl. No.: 16/563,469

(22) Filed: Sep. 6, 2019

(65) Prior Publication Data

US 2021/0075533 A1    Mar. 11, 2021

(51) Int. Cl.
  *H04N 9/89*   (2006.01)
  *H04J 3/06*   (2006.01)
  *H04L 29/06*  (2006.01)

(52) U.S. Cl.
  CPC .......... *H04J 3/0682* (2013.01); *H04J 3/0658* (2013.01); *H04L 65/4076* (2013.01); *H04L 65/60* (2013.01)

(58) Field of Classification Search
  None
  See application file for complete search history.

(56) References Cited

U.S. PATENT DOCUMENTS

| | | |
|---|---|---|
| 6,094,671 A | 7/2000 | Chase et al. |
| RE38,405 E | 1/2004 | Clair, Jr. et al. |
| 6,757,517 B2 | 6/2004 | Chang |
| 7,539,219 B2 | 5/2009 | Kwong et al. |
| 7,684,377 B2 | 3/2010 | Lee et al. |
| 7,702,403 B1 | 4/2010 | Gladwin et al. |
| 7,805,210 B2 | 9/2010 | Cucos et al. |
| 7,940,667 B1 | 5/2011 | Coady et al. |
| 7,987,294 B2 | 7/2011 | Bryce et al. |
| 9,282,418 B2 | 3/2016 | Tam |
| 2001/0041588 A1 | 11/2001 | Holstrom et al. |
| 2002/0002039 A1 | 1/2002 | Qureshey et al. |
| 2002/0072816 A1 | 6/2002 | Shdema et al. |
| 2002/0124097 A1 | 9/2002 | Isely |

(Continued)

FOREIGN PATENT DOCUMENTS

| | | |
|---|---|---|
| JP | S64-044199 A | 2/1989 |
| JP | 2005-079614 A | 3/2005 |

(Continued)

OTHER PUBLICATIONS

Aiello, G. Roberto and Rogerson, Gerald D., "Ultra-Wideband Wireless Systems", pp. 36-47, IEEE Microwave magazine, Jun. 2003.

(Continued)

*Primary Examiner* — Brandon M Renner
(74) *Attorney, Agent, or Firm* — Bever, Hoffman & Harms, LLP

(57) ABSTRACT

A cognitive loudspeaker system includes a control station (CS) that broadcasts clock control messages and separate playback messages to a plurality of sound production stations (SPSs). The clock control messages are generated in response to a CS clock signal. Each SPS generates a corresponding local conductor clock signal in response to the received control clock messages and a local SPS clock signal, such that all of the local conductor clock signals are synchronized. Each SPS also generates local digital playback samples in response to the received playback messages. The local digital playback samples are written to an output buffer in response to the local SPS clock signal, and are read from the output buffer in response to the local conductor clock signal.

24 Claims, 9 Drawing Sheets

(56) References Cited

U.S. PATENT DOCUMENTS

| | | | |
|---|---|---|---|
| 2003/0093669 A1 | 5/2003 | Morais et al. | |
| 2003/0185542 A1 | 10/2003 | McVeigh et al. | |
| 2005/0018780 A1* | 1/2005 | Kim | H04W 52/36 375/259 |
| 2005/0086273 A1 | 4/2005 | Loebbert et al. | |
| 2005/0113058 A1 | 5/2005 | Gosieski, Jr. | |
| 2005/0177256 A1 | 8/2005 | Shintani et al. | |
| 2005/0190928 A1 | 9/2005 | Noto | |
| 2005/0234731 A1 | 10/2005 | Sirivara et al. | |
| 2006/0126586 A1 | 6/2006 | Um et al. | |
| 2007/0022207 A1 | 1/2007 | Millington | |
| 2007/0121950 A1 | 5/2007 | Okaue | |
| 2007/0136778 A1 | 6/2007 | Birger et al. | |
| 2007/0214229 A1 | 9/2007 | Millington et al. | |
| 2008/0092204 A1 | 4/2008 | Bryce et al. | |
| 2008/0152165 A1 | 6/2008 | Zacchi | |
| 2008/0175395 A1 | 7/2008 | Rice | |
| 2008/0181424 A1 | 7/2008 | Schulein et al. | |
| 2009/0164905 A1 | 6/2009 | Ko | |
| 2009/0169030 A1 | 7/2009 | Inohara | |
| 2009/0180465 A1 | 7/2009 | Closset et al. | |
| 2009/0180631 A1 | 7/2009 | Michael et al. | |
| 2009/0304194 A1 | 12/2009 | Eggleston et al. | |
| 2010/0022183 A1 | 1/2010 | Ryle et al. | |
| 2010/0272270 A1 | 10/2010 | Chaikin et al. | |
| 2010/0299639 A1 | 11/2010 | Ramsay | |
| 2011/0015769 A1 | 1/2011 | Haatainen | |
| 2011/0270428 A1* | 11/2011 | Tam | H04S 3/008 700/94 |
| 2014/0010515 A1* | 1/2014 | Lee | H04L 65/605 386/207 |
| 2014/0082396 A1 | 3/2014 | Vahidsafa et al. | |
| 2014/0156103 A1 | 6/2014 | Feigenbaum | |
| 2014/0205126 A1 | 7/2014 | Faranda | |
| 2014/0286507 A1 | 9/2014 | Kallai et al. | |
| 2015/0207877 A1 | 7/2015 | Ito | |
| 2016/0105754 A1 | 4/2016 | Carlsson | |
| 2017/0277507 A1* | 9/2017 | Ando | H04R 27/00 |
| 2017/0303042 A1 | 10/2017 | Hammer | |
| 2017/0318068 A1* | 11/2017 | Kikkeri Shivadatta | H04N 21/242 |
| 2018/0234936 A1 | 8/2018 | Crowe et al. | |
| 2018/0246524 A1 | 8/2018 | Hillen | |
| 2018/0359691 A1 | 12/2018 | Young | |
| 2019/0354338 A1 | 11/2019 | Coburn, IV | |
| 2019/0354339 A1 | 11/2019 | Coburn, IV | |
| 2020/0022100 A1* | 1/2020 | Simon | H04W 56/0015 |
| 2021/0092520 A1 | 3/2021 | Tam | |
| 2021/0160639 A1 | 5/2021 | Tam | |

FOREIGN PATENT DOCUMENTS

| | | |
|---|---|---|
| JP | 2010-056970 A | 3/2010 |
| KR | 20010044634 A | 6/2001 |
| WO | 2004/034602 A1 | 4/2004 |
| WO | 2008/103091 A1 | 8/2008 |
| WO | 2008/113053 A1 | 9/2008 |
| WO | 2009/112070 A1 | 9/2009 |

OTHER PUBLICATIONS

Geer, David, "UWB Standardization Effort Ends in Controversy", pp. 13-16, IEEE Computer Society, Jul. 2006.

Mercier, Patrick P., et al., "An Energy-Efficient All-Digital UWB Transmitter Employing Dual Capacitively-Couple Pulse-Shaping Drivers", pp. 1679-1688, IEEE Journal of Solid-State Circuits, vol. 44, No. 6, Jun. 6, 2009.

Ultralink/XLO Products, Inc.,"Argentum Accourtics Cables by Ultralink/XLO at CES 2009", 2 pages, Jan. 14, 2009.

Stadius, Kari et al., "Multitone Fast Frequency-Hopping Synthesizer for UWB Radio", pp. 1633-1641, IEEE Transactions on Microwave Theory and Techniques, vol. 55, No. 8, Aug. 2007.

Pioneer Electronics U.S.A., Elite SC-27 "7.1-Channel A/V Receiver Featuring ICEpower Class-D Amplification . . . " brochure, 2 pages, 2009.

Roy, Sumit et al., "Ultrawideband Radio Design: The Promise of High-Speed, Short-Range Wireless Connectivity", pp. 295-311, Proceedings of the IEEE, vol. 92, No. 2, Feb. 2004.

Linksys by Cisco brochure entitled "Introducing Wireless Home Audio", 7 pages, date unknown.

Yamaha MusicCAST2 MCX-RC100 and MCX-A300/MCX-P200 Owner's Manual, 20 pages, 2009.

Yamaha DME Manual; copyright 2004.

ID3 Draft specification; copyright 1968.

* cited by examiner

TIMING IMPROVEMENT FOR COGNITIVE LOUDSPEAKER SYSTEM

FIELD OF THE INVENTION

The present invention relates to a sound production system for digital audio sources. More specifically, the present invention relates a method and system for improving playback timing across a plurality of sound production stations.

RELATED ART

FIG. 1 is a block diagram of a conventional digital audio playback system 100, which includes a digital audio source 101, an audio processor 102, and loudspeakers 111-113. Digital audio source 101 provides a digital audio bit stream to audio processor 102. The digital audio bit stream can be transmitted, for example, over an HDMI cable or using a wireless transmission protocol (WiFi). The digital audio bit stream can be provided by an audio source, such as a music streaming service (e.g., Spotify or Tidal), a mobile device (e.g., a smart phone or tablet), a smart home device (e.g., Google Home or Amazon Alexa), or a music server. The digital audio bit stream can alternately be provided by an audio-video source, such as streaming video from the Internet (e.g., YouTube or Netflix), networked HDTV or video gaming.

Audio processor 102 includes an audio decoder 120, which receives the digital audio bit stream from digital audio source 101. The digital audio bit stream is played back in multiple channels in order to re-create a three dimensional (3D) sound effect. Examples of multi-channel playback systems include conventional two channel stereo systems, 5.1 channel systems (e.g., for Dolby AC-3 coding), Dolby Surround 7.1 channel systems and Dolby ATMOS. In these multi-channel systems, each channel is played back in a different spatial location.

The digital audio bit stream is typically encoded in a highly compressed bit stream. Most of the information for the various channels is coded as a single channel with some extra information in the digital bit stream in order to avoid the linear increment of the bit rate for each additional channel. Hence, audio decoder 120 is used to decode the digital audio bit stream to re-create each channel. Audio decoder 120 also generates an audio sample clock to synchronize each channel. The audio sample clock typically has a frequency of 44 to 96 kHz, based on an audio spectrum of 20-20 kHz. The audio quality and effect will suffer if the sample clock for each channel is out of synchronization.

Audio processor 102 also includes digital-to-analog (D/A) converters 121-123 for each channel. Each of the D/A converters 121-123 receives the decoded digital bit stream for the associated channel and the audio sample clock from the audio decoder 120. In response, each of the D/A converters 121-123 provides an analog output signal for the associated channel. Power amplifiers 131-133 receive the analog output signals from the D/A converters 121-123, respectively. In response, power amplifiers 131-133 drive amplified analog output signals to speakers 111-113, respectively, over speaker cables.

In a typical digital audio system (which implements a centralized audio processor model), audio decoder 120, D/A converters 121-123 and the power amplifiers 131-133 are included in the same box. Examples of this type of equipment include an audio/video (A/V) processor, media server client and Media Devices. In general, audio processor 102 is required to provide the required power amplification for all of the channels. As a result, audio processor 102 is a relatively expensive device. Moreover, audio processor 102 implements preset signal processing and decoding functions, which may limit the future expansion of this device. In addition, speaker wires are needed to connect the audio processor 102 to each of the associated loudspeakers 111-113. As the number of channels increases, so does the required number of speaker wires. Market research has shown that the routing of speaker wires is a major obstacle for the adoption of surround sound systems.

In an active loudspeaker model, the power amplifiers 131-133 are included in the same box as the loudspeakers 111-113, rather than in the audio processor 102. However, this model still exhibits the problems described above.

A typical 5.1 home theater system requires the connection of two pair of wires from the audio processor 102 to a pair of surround speakers in the back of the room. As described above, this creates a very significant inconvenience for adopting a surround sound system. One solution available to solve this problem is wireless speaker technology. Wireless loudspeakers use invisible radio waves in lieu of physical speaker cables to transport sound from the audio processor 102 at the front of the room to surround speakers at the rear of the room.

In this case, the audio processor 102 must include a wireless transmitter, undesirably increasing the cost and complexity of this device. A small power amplifier/RF receiver is typically placed near the rear of the room (e.g., under a couch), and speaker wires are run from this power amplifier/RF receiver to the surround speakers, a few feet away. Thus, speaker wires must still be used in this system. A subset of the audio channels (i.e., the audio channels to be played through the surround speakers) are transmitted through the wireless interface from the audio processor 102 to the remote power amplifier/RF receiver, and are played through the surround speakers. Note that by transmitting a subset of the audio channels wirelessly, while transmitting the remaining audio channels through speaker cables, the sound quality and the surround effect can be significantly compromised.

It would therefore be desirable to have an audio system that overcomes the above-described deficiencies of a conventional audio system.

U.S. Pat. No. 9,282,418 (hereinafter, the '418 Patent), describes a cognitive loudspeaker system that includes an active control station that communicates wirelessly and bi-directionally with a plurality of sound production stations. The control station and the sound production stations are initially synchronized to a conductor clock. During a setup process, configuration information is transmitted from the sound production stations to the active control station. In response to the received configuration information, the active control station generates playback executables for each of the sound production stations. The active control station wirelessly transmits the playback executables to the sound production stations. After the setup process is complete, the active control station wirelessly transmits digital audio information (which is received from a digital audio source) to the sound production stations. Within each sound production station, the previously received playback executable is used to control the decoding and processing of the received digital audio information. Each sound production station generates digital audio output samples in response to the received digital audio information (and the associated playback executable). The digital audio samples are converted to an analog output signal, which is amplified and played through a speaker. Thus, the active control station establishes a virtual decoder within each of the sound production stations, which enables playback from various sources. The virtual decoder allows the cognitive loudspeaker system to be easily modified/updated to handle new coding protocols.

The '418 Patent describes the use of an ultra-wide band (UWB) wireless interface to transmit messages between the active control station and the sound production stations. The UWB wireless interface has been standardized (IEEE 802.15), such that the use of this interface may result in a multi-access problem. In a multi-access environment, multiple agents share the same wireless medium through standardized methods. As a result, the sender cannot guarantee that data is sent to the receiver at a precise moment. It becomes more difficult to guarantee this timing when the data payload is large, as is the case for an audio playback stream. However, timing accuracy of the message units sent from the control station to the sound production stations is critical to the operation of the cognitive loudspeaker system (i.e., the '418 Patent relies on a 'just-in-time' playback stream delivery method).

Moreover, the '418 Patent teaches that both timing and data information are embedded in the same packet, wherein loss of a packet or a corrupted message unit can result in significant function and performance problems.

It would therefore be desirable to have an improved cognitive loudspeaker system that overcomes the above-described deficiencies of the '418 Patent.

SUMMARY

Accordingly, the present invention provides an improved method for implementing the transport of playback timing information and a playback stream from the control station to the sound production stations of a cognitive loudspeaker system.

In one embodiment, a cognitive loudspeaker system includes a control station that transmits clock control messages and separate playback messages, wherein the clock control messages are generated in response to a first clock signal within the control station. The cognitive loudspeaker system also includes one or more sound production stations (SPS), each receiving the clock control messages and the playback messages. Each sound production station includes a clock generation circuit that generates a local conductor clock signal in response to the received clock control messages and a local SPS clock signal generated within the sound production station. The local conductor clock signal within each sound production station is synchronized to the first clock signal. A playback processor in each sound production station generates digital playback samples in response to the received playback messages. A memory in each sound production station receives and stores the digital playback samples from the playback processor in response to the local SPS clock signal. The memory in each sound production station outputs the stored digital playback samples in response to the local conductor clock signal.

In one embodiment, the clock control messages are transmitted on a first communication channel and the playback messages are transmitted on a second communication channel. The first and second communication channels can be wireless communication channels. Alternately, the first communication channel can be a wireless communication channel and the second communication can be a powerline Ethernet channel.

In another embodiment, the clock control messages and the playback messages are transmitted at different times on a shared wireless communication channel (e.g., an IEEE 802.11 network).

In one embodiment, the control station includes a modulo counter having a count that cyclically changes from an initial count value to a final count value in response to the first clock signal, wherein a time required to count from the initial count value to the final count value corresponds with a period of the local conductor clock signals.

In one embodiment, the clock control messages include: (1) a first clock control message that includes a first count value (C1) of the modulo counter, wherein the first count value indicates when the first clock control message is transmitted, and (2) a second clock control message that includes a second count value (C2) of the modulo counter, wherein the second count value indicates when the second clock control message is transmitted, and a third count value (C3) that specifies a difference between the second count value and the final count value of the modulo counter.

In this embodiment, the clock generation circuit within each SPS generates the corresponding local conductor clock signal in response to the first, second and third count values. In a particular embodiment, each clock generation circuit includes an incrementor that is loaded with the first count value, and counts from the first count value in response to the local SPS clock signal, until the SPS receives the second clock control message, wherein the count of the incrementor is latched as an incremented count value (I_CNT) when the SPS receives the second clock control message.

The clock generation circuit within each SPS further determines a transmission delay (CS-TO-SPS_DELAY_CYC$_{SPS}$) of the playback messages from the control station to the SPS, in units of cycles of the local SPS clock signal.

The clock generation circuit within each SPS further includes a calculation unit that uses the first count value, the second count value, the third count value, the incremented count value and the transmission delay to calculate a number of cycles (DEC_0) of the local SPS clock signal until the full count value of the modulo counter is reached. In one embodiment, the calculation unit calculates the number of cycles (DEC_0) in accordance with the following equation:

$$DEC\_0 = C3*((I\_CNT - C1)/(C2 - C1)) - CS\text{-}TO\text{-}SPS\_DELAY\_CYC_{SPS}.$$

The clock generation circuit within each SPS further includes a decrementor, wherein the decrementor is loaded with the calculated number of cycles (DEC_0), and counts down in a zero count in response to the local SPS clock signal. When the decrementor reaches a zero count, the clock generation circuit asserts the local conductor clock signal.

The present invention also includes a method including: (1) broadcasting clock control messages and separate playback messages from a control station to a plurality of sound production stations, wherein the clock control messages are generated in response to a first clock signal within the control station; (2) generating a local conductor clock signal within each of the sound production stations in response to the clock control messages and a local SPS clock signal generated within each of the sound production stations; (3) generating digital playback samples in each of the sound production stations in response to the playback messages; (4) storing the digital playback samples generated in each of the sound production stations in response to the local SPS clock signal; and (5) retrieving the stored digital playback samples in each of the sound productions stations in response to the local conductor clock signal.

The present invention will be more fully understood in view of the following description and drawings.

DETAILED DESCRIPTION

In general, the present invention provides a cognitive loudspeaker system for playback from digital audio sources. The cognitive loudspeaker system includes an active control station (CS) and one or more sound production stations (SPSs). As described in more detail below, the cognitive loudspeaker system of the present invention includes systems and methods for synchronizing a plurality of audio channels through a wireless interface.

Figure 1:
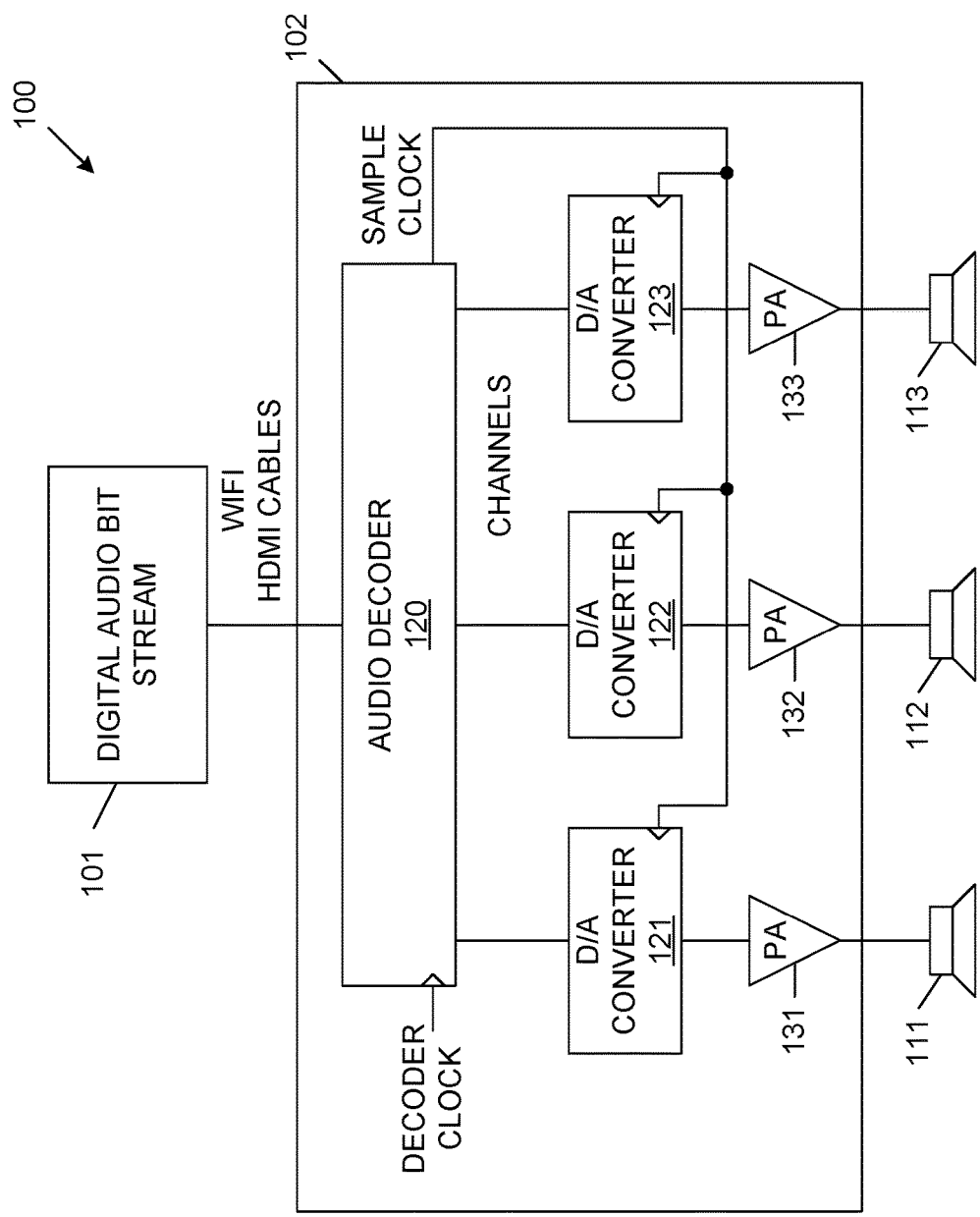
FIG. 1 is a block diagram of a conventional digital audio playback system.
Figure 2:
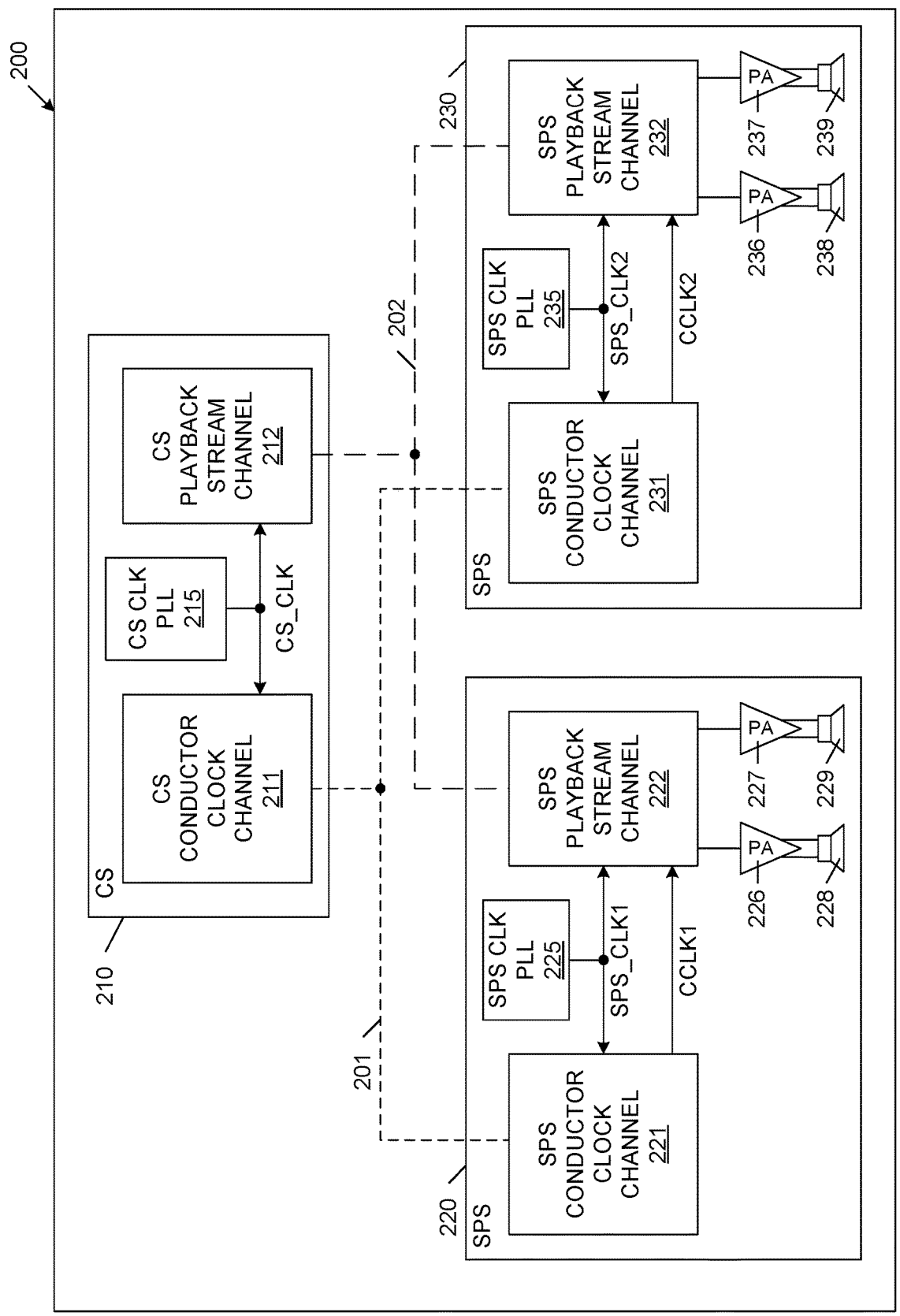
FIG. 2 is a block diagram of a cognitive loudspeaker system in accordance with one embodiment of the present invention.

FIG. 2 is a block diagram of a cognitive loudspeaker system (CLS) 200 in accordance with one embodiment of the present invention. CLS 200 includes control station (CS) 201 and sound production stations (SPS) 220 and 230. Control station 201 includes circuitry for implementing a CS conductor clock channel 211 and a CS playback stream channel 212. Control station 201 also includes a phase locked loop (PLL) 215 for generating a local CS clock signal (CS_CLK). As described in more detail below the local CS clock signal CS_CLK controls the timing of operations within the CS conductor clock channel 211 and the CS playback stream channel 212.

Sound production station 220 includes circuitry for implementing an SPS conductor clock channel 221 and an SPS playback stream channel 222. SPS 220 also includes a PLL 225 for generating a local SPS clock signal (SPS_CLK1). SPS playback stream channel circuitry 222 is coupled to power amplifiers (PA) 226-227 and loudspeakers 228-229, as illustrated.

Similarly, sound production station 230 includes circuitry for implementing an SPS conductor clock channel 231 and an SPS playback stream channel 232. SPS 230 also includes a PLL 235 for generating a local SPS clock signal (SPS_CLK2). SPS playback stream channel 232 is coupled to power amplifiers (PA) 236-237 and loudspeakers 238-239, as illustrated.

Although two sound production stations 220 and 230 are illustrated (e.g., to implement stereo sound), it is understood that other numbers of sound production stations can be used in other embodiments. Although each of the sound production stations 2220 and 230 includes two power amplifiers and two speakers, it is understood that sound production stations 220 and 230 can have other numbers of power amplifiers and speakers in other embodiments.

Control station 210 communicates with sound production stations 220 and 230 using communication channels 201 and 202. More specifically, the CS conductor clock channel circuitry 211 communicates with SPS conductor clock channel circuitry 221 and 231 using conductor clock communication channel 201, and the CS playback stream channel circuitry 212 communicates with SPS playback stream channel circuitry 222 and 232 using playback stream communication channel 202. Communication channels 201 and 202 are bi-directional communication channels.

As described in more detail below, conductor clock communication channel 201 and playback stream communication channel 202 can be implemented using wired or wireless communication channels. For example, conductor clock communication channel 201 can be implemented wirelessly using WiFi in accordance with the IEEE 802.11 standard, or using the ultra-wide band (UWB) frequency spectrum. By using the UWB frequency spectrum, the circuitry implemented by cognitive loudspeaker system 200 can be relatively simple for the bit rate, range and channel environment. More specifically, impulse radio transceivers can be implemented within the control station 210 and sound production stations 220/230 to establish a scalable, very low jitter, low latency synchronized system.

Playback stream communication channel 202 can be implemented using a (wired) powerline Ethernet channel, or using a (wireless) WiFi channel in accordance with the IEEE 802.11 standard.

In one embodiment, conductor clock communication channel 201 and playback stream communication channel 202 are implemented using different communication protocols. For example, conductor clock communication channel 201 can be implemented using WiFi in accordance with the IEEE 802.11 standard, and playback stream communication channel 202 can be implemented using a powerline Ethernet system. In another embodiment, conductor clock communication channel 201 is implemented using a UWB channel, and playback stream communication channel 202 is implemented using a WiFi channel in accordance with the IEEE 802.11 standard. Other combinations are possible and are considered to be included in the present invention.

In an alternate embodiment, conductor clock communication channel 201 and playback stream communication channel 202 are implemented using the same communication protocol. For example, conductor clock communication channel 201 and playback stream communication channel 202 can both be implemented using a common WiFi system in accordance with the IEEE 802.11 standard. In this embodiment, different messages, having different access categories within the WiFi protocol may be used to implement the conductor clock communication channel 201 and the playback stream communication channel 202. In this embodiment, the conductor clock communication channel 201 is implemented using the highest priority access category available in the 802.11 protocol and the playback stream communication channel 202 is implemented using a lower priority access category. In this embodiment, transceivers 312 and 322 within control station 210 can be combined, such that the conductor clock messages and the playback stream messages are transmitted through a single transceiver (at different times). Similarly, transceivers 401 and 420 within SPS 220 can be combined, such that the conductor clock messages and the playback stream messages are received by a single transceiver within SPS 220 (at different times). In this embodiment, the received conductor clock messages are routed to conductor clock generation logic 410, and the received playback stream messages are routed to playback stream FIFO 421. Although the conductor clock messages and playback stream messages are transmitted on the same wireless system, the transmission of these messages is considered to occur on logically separate channels 201 and 202.

Note that in all embodiments, the conductor clock communication channel 201 is effectively separate (or decoupled) from the playback stream communication channel 202.

In general, CLS system 200 operates as follows. PLL 215 generates the local CS clock signal CS_CLK, which is used to control the timing of CS conductor clock channel circuitry 211 and CS playback stream channel circuitry 212. CS playback stream channel circuitry 212 transmits and receives messages (e.g., configuration messages, control messages, and playback messages that include digital audio information) on playback stream channel 202 in response to the local CS clock signal CS_CLK. Similarly, SPS playback stream channel circuits 222 and 223 transmit and receive messages on playback stream channel 202 in response to the local SPS clock signals SPS_CLK1 and SPS_CLK2, respectively.

CS conductor clock channel circuit 211 generates conductor clock messages in response to the local CS clock signal CS_CLK, and transmits these conductor clock messages on conductor clock channel 201. SPS conductor clock channel circuits 221 and 231 receive the conductor clock messages transmitted on conductor clock channel 201. In response to the received conductor clock messages, and the local clock signals SPS_CLK1 and SPS_CLK2, the SPS conductor clock channel circuits 221 and 231 generate local conductor clock signals CCLK1 and CCLK2, respectively, wherein the local conductor clock signals CCLK1 and CCLK2 are synchronous with a specified edge of the local CS clock signal CS_CLK. As described in more detail below, rising edges of the local conductor clock signals CCLK1 and CCLK2 are asserted when a modulo counter within control station 210 (which is clocked by the local CS clock signal (CS_CLK)) becomes full. The conductor clock signals CCLK1 and CCLK2 are used to read previously stored digital audio samples from SPS playback stream channel circuits 222 and 232, respectively.

As described in more detail below, the time delays from the control station 210 to each of the sound production stations 220 and 230 on playback stream channel 202 are determined during a configuration phase of the cognitive loudspeaker system 200. These time delays are also used to synchronize the local conductor clock signals CCLK1 and CCLK2.

Figure 3:
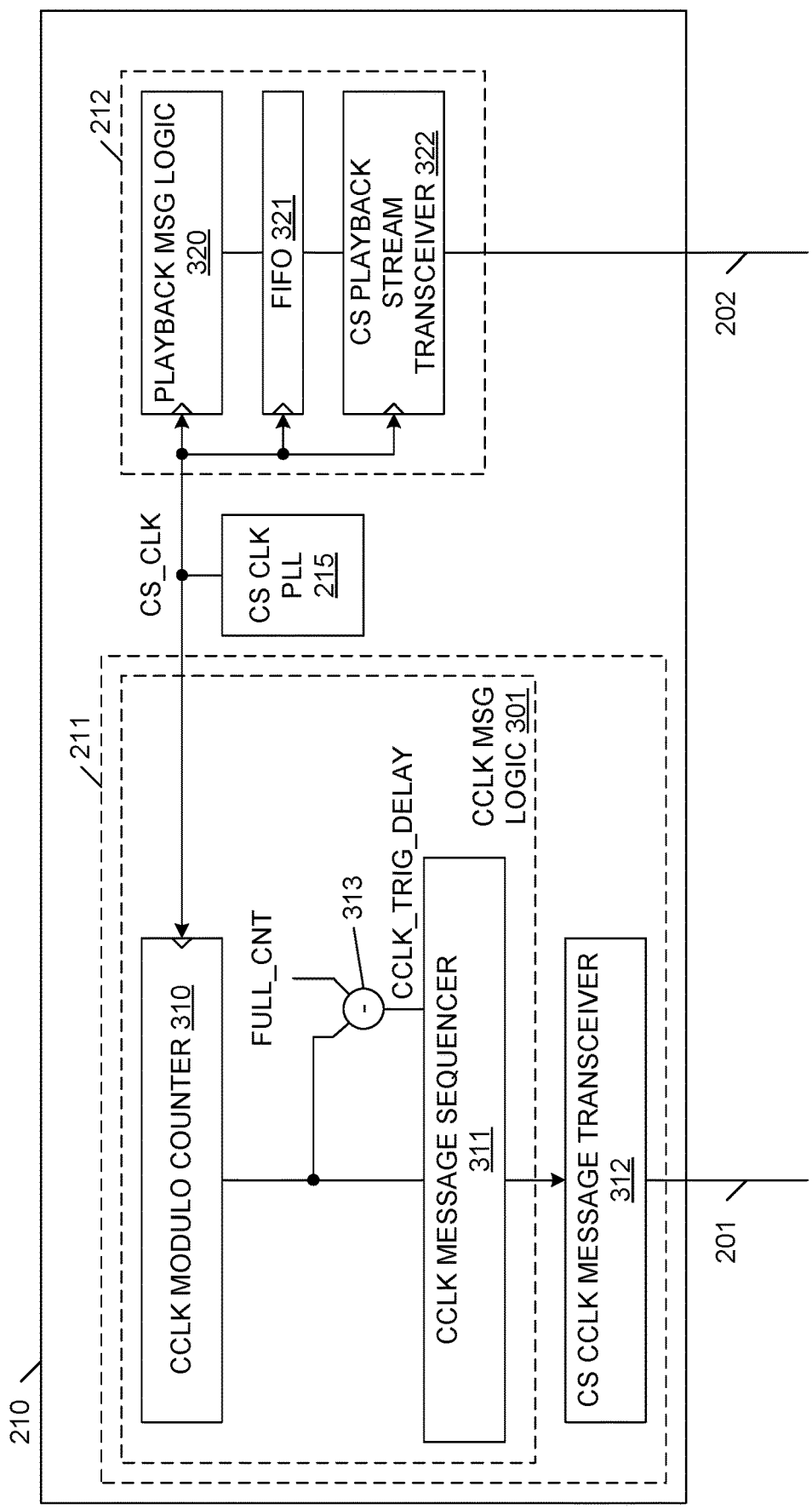
FIG. 3 is a block diagram illustrating a control station of the cognitive loudspeaker system of FIG. 2 in more detail in accordance with one embodiment of the present invention.

FIG. 3 is a block diagram illustrating control station 210 in more detail in accordance with one embodiment of the present invention. CS conductor clock circuit 211 includes conductor clock modulo counter 310, which is clocked by the local CS_CLK signal. The count value of counter 301 is provided to conductor clock message sequencer 311, and to a first input of subtraction circuit 313. The second input of subtraction circuit 313 is coupled to receive a FULL_CNT value, which represents the full count value of conductor clock modulo counter 310 (i.e., modulo counter 310 counts from up from zero to the FULL_CNT value, and then wraps around to zero). Conductor clock message sequencer 311 generates conductor clock messages (described in more detail below), which are provided to CS conductor clock message transceiver 312. CS conductor clock message transceiver 312 transmits the conductor clock messages on conductor clock channel 201.

As illustrated by FIG. 3, CS playback stream channel circuitry 212 includes playback message logic 320, first in, first out (FIFO) memory 321 and control station playback stream transceiver 322, each of which operates in response to the local CS_CLK signal. Playback message logic 320 generates playback messages, which are stored in FIFO memory 321, and then transferred to CS playback stream transceiver 322. CS playback stream transceiver 322 transmits the playback messages on playback message channel 202. The playback messages can include, but are not limited to, messages that include digital audio signals of a playback stream, configuration messages, and control messages. Configuration messages may include messages that are transmitted between the control station 210 and the sound production stations 220 and 230 to determine the transmission delays between these stations, and messages that define playback executables to be implemented within the sound production stations 220 and 230. Playback messages that can be implemented by the present invention include those described in the '418 patent, which is hereby incorporated by reference in its entirety.

Figure 4:
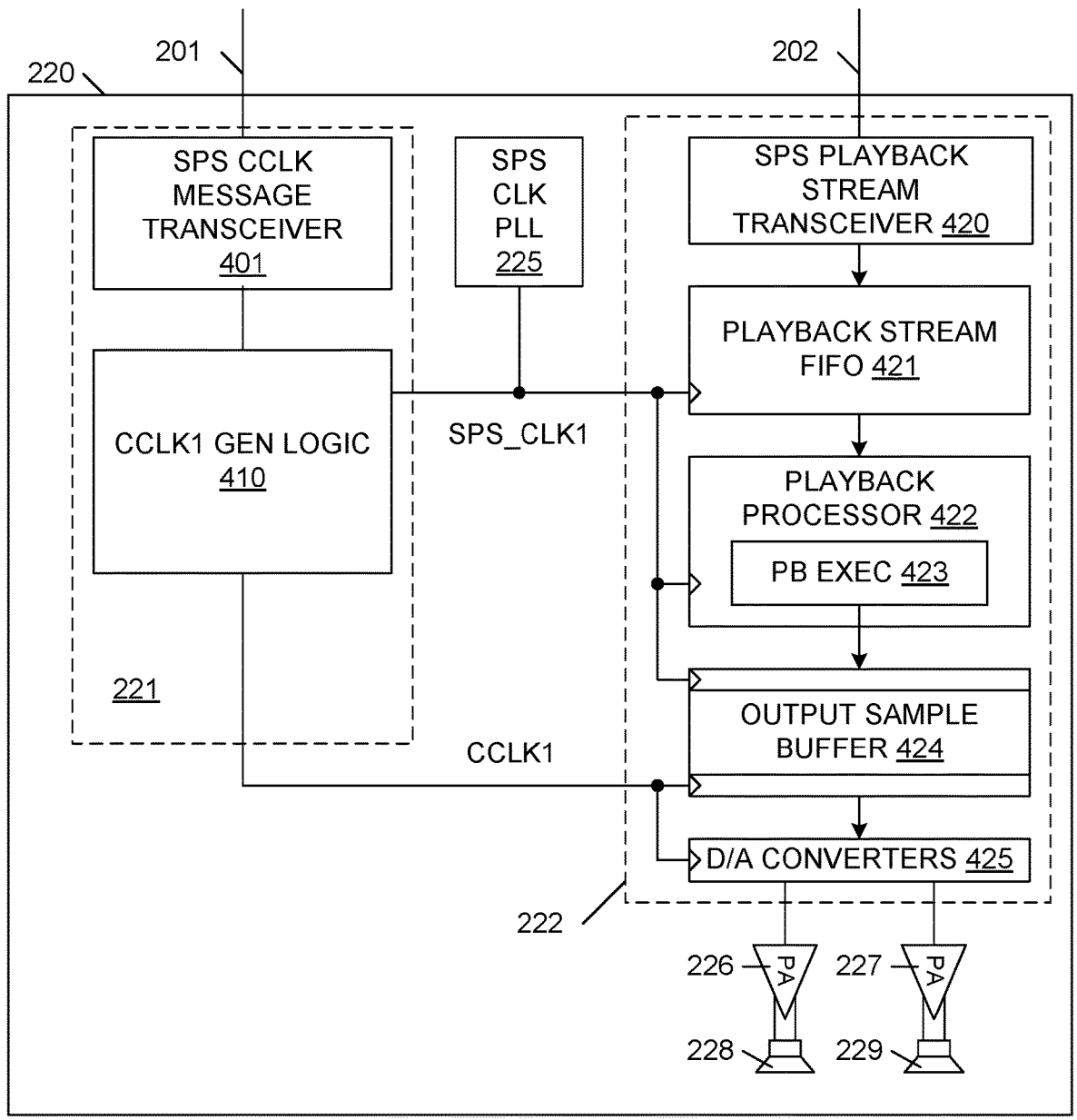
FIG. 4 is a block diagram illustrating a sound production station of the cognitive loudspeaker system of FIG. 2 in more detail in accordance with one embodiment of the present invention.

FIG. 4 is a block diagram illustrating sound production station 220 in more detail in accordance with one embodiment of the present invention. It is understood that sound production station 230 has the same construction (and operates in the same manner as) the illustrated sound production station 220.

SPS playback stream channel circuit 222 includes SPS playback stream transceiver 420, which receives the playback messages transmitted on channel 202 (and also transmits configuration and control messages on channel 202). The available bandwidth of channel 202 is selected to be greater than the required bandwidth of cognitive loudspeaker system 200. In one embodiment, the control station 201 transmits the playback messages ahead of the playback schedule. The received playback messages are written to playback stream FIFO memory 421. The playback messages are read from FIFO memory 421 and provided to playback processor 422 in response to local clock signal SPS_CLK1. The amount of time that the playback messages are transmitted ahead of schedule is a design choice, which depends on the size of FIFO memory 421 and the flow control policy adopted for the playback stream channel 202. However, because the control station 210 transmits the playback stream messages and controls how the playback stream messages in the FIFO memory 421 are consumed, a very simple flow control policy can be used. For example, the control station 210 can simply maintain N playback stream messages in FIFO memory 421, where N is the number of entries in FIFO memory 421.

Playback processor 422 processes the playback messages in accordance with the programmable playback executable 423. As described by the '418 patent, programmable playback executable 423 is provided to SPS 220 (and a similar playback executable is provided to SPS 230) by control station 210 during the configuration of cognitive loudspeaker system 200. Programmable playback executable 423 enables playback processor 422 to decode digital audio information for its designated audio channel using different coding protocols. Playback processor 422 is clocked by the local clock signal SPS_CLK1. Playback processor 422 generates digital audio samples in response to the received playback messages. These digital audio samples are written to output sample buffer 424 in response to the local SPS_CLK1 signal. In accordance with one embodiment of the present invention the digital audio samples stored in output sample buffer 424 are read out and provided to digital-to-analog converters (DACs) 425 in response to the conductor clock signal CCLK1. DACs 425 convert the digital audio samples to analog audio signals, which are transmitted to power amplifiers 226-227 and loudspeakers 228-229. DACs 425 also operate in response to the conductor clock signal CCLK1. As described in more detail below, the conductor clock signal CCLK1 and the conductor clock signal CCLK2 are precisely synchronized to edges of the CS_CLK signal the cause the modulo counter 301 to reach the FULL_CNT value.

SPS conductor clock channel circuit 221 includes SPS conductor clock message transceiver 401, which receives the conductor clock messages transmitted on channel 201, and conductor clock generation logic 410, which generates the local conductor clock signal CCLK1 in response to the received conductor clock messages.

Figure 5:
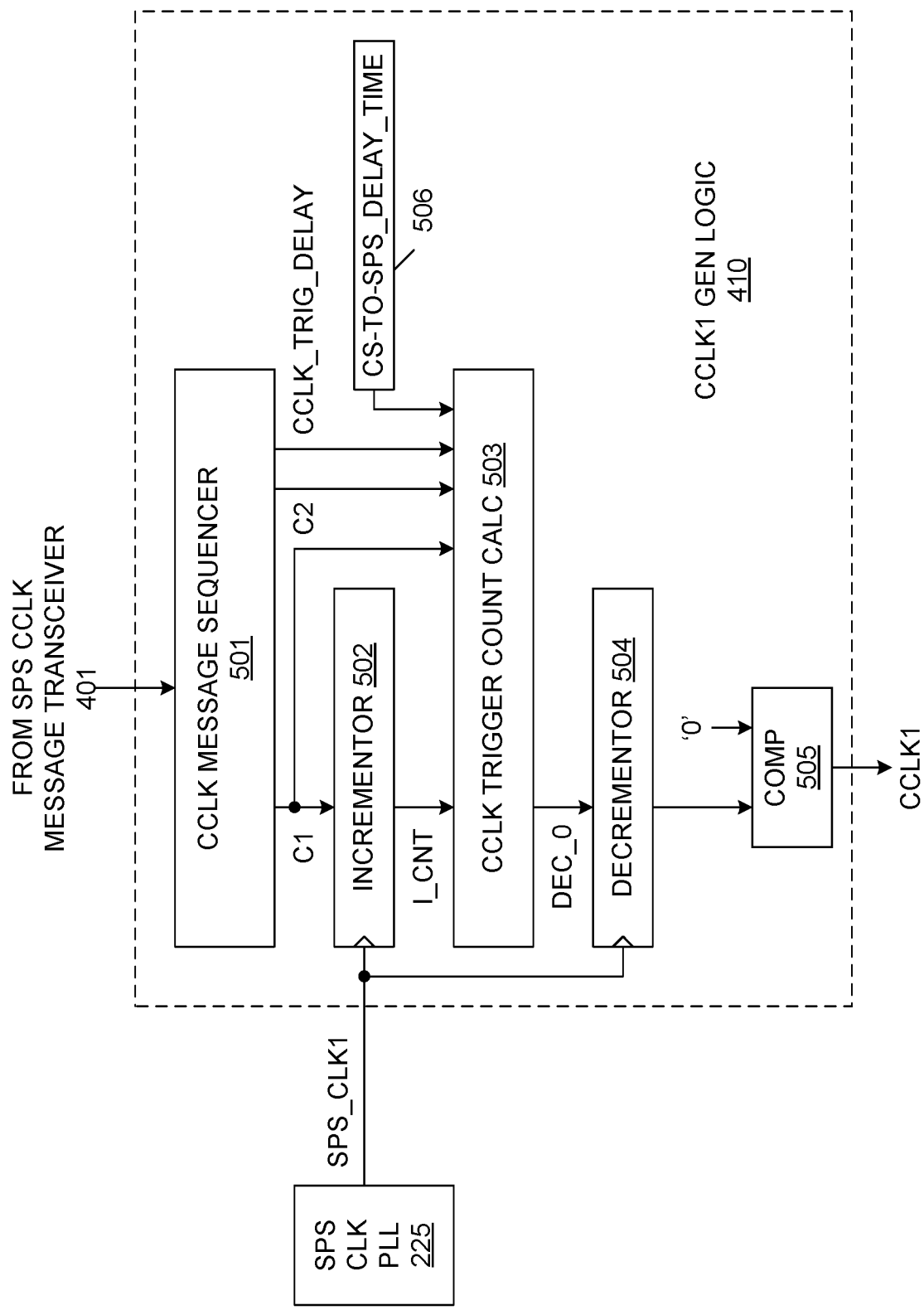
FIG. 5 is a block diagram illustrating conductor clock generation logic of the sound production station of FIG. 4 in more detail in accordance with one embodiment of the present invention.

FIG. 5 is a block diagram illustrating conductor clock generation logic 410 in more detail in accordance with one embodiment of the present invention. Conductor clock generation logic 410 includes conductor clock message sequencer 501, incrementor circuit 502, conductor clock trigger count calculator 503, decrementor circuit 504, comparator circuit 505 and message delay memory 506, which are connected as illustrated. Incrementor circuit 502 and decrementor circuit 504 are clocked by the local SPS clock signal SPS_CLK1 generated by PLL 225.

Figure 6:
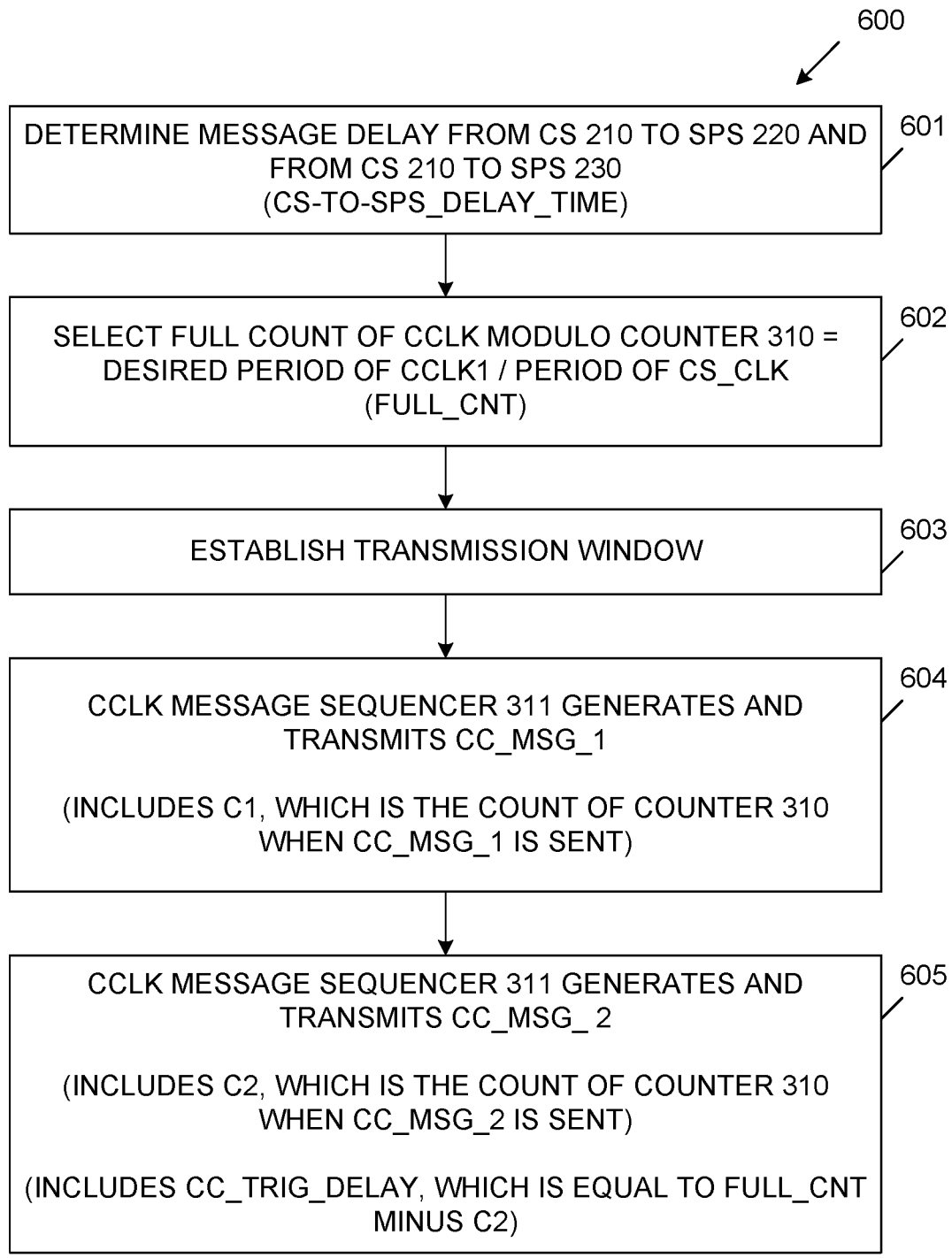
FIG. 6 is a flow diagram illustrating operations performed within the control station of FIG. 3 to enable the generation of a conductor clock signal in the sound production station of FIGS. 4 and 5, in accordance with one embodiment of the present invention.

The generation of the conductor clock signal CCLK1 will now be described in more detail. FIG. 6 is a flow diagram 600 illustrating operations performed within control station 210 to enable the generation of the conductor clock signals CCLK1 and CCLK2 in the sound production stations 220 and 230, respectively, in accordance with one embodiment of the present invention. Initially, control station 210 determines the transmission delay for messages sent from control station 210 to sound production station 220 and sound production station 230 on playback message channel 202 (Step 601). In one embodiment, the transmission delay from control station 210 to sound production station 220 is determined by: (1) transmitting a message from playback message logic circuit 320 (FIG. 3) in control station 210 to playback processor 422 (FIG. 4) in sound production station 220, (2) in response, transmitting a return message from the playback processor 422 in SPS 220 to playback message logic circuit 320, (3) measuring the time required for the round-trip transmission of the message, and (4) dividing the round-trip transmission time by two, thereby calculating the message delay (CS-TO-SPS_DELAY_TIME) from CS 210 to SPS 220. Other methods for determining the message delay from control station 210 to SPS 220 can be implemented in other embodiments. The message delay value CS-TO-SPS_DELAY_TIME is stored in memory 506 of CCLK1 generation logic 410 (FIG. 5). In the described examples, the CS-TO-SPS_DELAY_TIME is 4 microseconds.

The message delay from control station 210 to SPS 230 is also determined (e.g., in the same manner described above). Note that the message delay from control station 210 to SPS 220 can be different than the message delay from control station 210 to SPS 230.

The full count (FULL_CNT) of the conductor clock modulo counter 310 is selected such that the period of the local CS_CLK signal times this full count value (FULL_CNT) is equal to the target audio sampling period of the conductor clock signal CCLK1 (and the conductor clock signal CCLK2) (Step 602). In the present example, the local CS_CLK signal has a frequency of 100 MHz (i.e., a period of 0.01 microsecond), and the conductor clock modulo counter 310 has a full count value FULL_CNT=1000. In this case, the conductor clock signal CCLK1 (and the conductor clock CCLK2) has a frequency of 100 kHz (i.e., a period of 10 microseconds). Note that the full count value FULL_CNT can be adjusted to adjust the frequency of the conductor clock signal CCLK1, as desired. Also note that the conductor clock signal CCLK2 (of SPS 230) will have the same frequency as the conductor clock signal CCLK1.

Conductor clock message sequencer 311 establishes a transmission window on the conductor clock message channel 201 (Step 603). In an embodiment where the conductor clock message channel 201 is implemented using WiFi in accordance with the IEEE 802.11e standard, conductor clock message sequencer 311 defines the transmission window using the TSPEC and TXOP instructions. In this example, conductor clock message sequencer 311 is allocated a QoS (quality of service) transmission opportunity having a high timing precision. In particular, the message sequencer 311 is allowed to transmit a first conductor clock message (CC_MSG_1) regularly, with a bounded jitter. Subsequently, the message sequencer can transmit a second conductor clock message (CC_MSG_2) within the allocated transmission window. In other embodiments, other time-division-multiplexing multi-access schemes can be used to establish a proper transmission window.

After the transmission window is established, conductor clock message sequencer 311 generates and transmits a first conductor clock message (CC_MSG_1) via transceiver 312 on conductor clock channel 201 (Step 604). The first conductor clock message CC_MSG_1 includes a first counter value C1, which is the value of the CCLK modulo counter 310 at the time the first conductor clock message CC_MSG_1 is sent. In the described example, the first conductor clock message CC_MSG_1 has a first counter value C1 equal to '25'.

Conductor clock message sequencer 311 subsequently generates and transmits a second conductor clock message (CC_MSG_2) on conductor clock channel 201 within the allocated transmission window (Step 605). The timing of the transmission of the first and second conductor clock messages CC_MSG_1 and CC_MSG_2 is controlled to be as precise as allowed at the 802.11 protocol stack used to transmit these messages. In the described embodiments, the period between transmitting the first and second conductor clock messages CC_MSG_1 and CC_MSG_2 is less than the period of the conductor clock signal CCLK1. The second conductor clock message CC_MSG_2 includes a second counter value C2, which is the value of the CCLK modulo counter 310 at the time the second conductor clock message CC_MSG_2 is sent. The second conductor clock message CC_MSG_2 also includes a conductor clock trigger delay value (CCLK_TRIG_DELAY), which is calculated by subtraction circuit 313 (FIG. 3), by subtracting the second counter value C2 from the full count value FULL_CNT. Advantageously, the conductor clock message size is relatively small, facilitating the scheduling and transmission of these messages.

In accordance with one embodiment, conductor clock message sequencer 311 generates one first conductor clock message (CC_MSG_1) and one second conductor clock message (CC_MSG_2) during each period of the conductor clock signal CCLK1. In the present example, the second clock message CC_MSG_2 has a second counter value C2 equal to '425' (i.e., 400 cycles of the CS_CLK signal after the first clock message CC_MSG_1 is sent with first counter value C1=25). In this example, the conductor clock trigger delay value) CCLK_TRIG_DELAY is equal to '575' cycles of the CS_CLK signal (CCLK_TRIG_DELAY=FULL_CNT−C2=1000−425=575).

Both of the sound production stations 220 and 230 receive and process the first and second clock messages CC_MSG_1 and CC_MSG_2, and in response, generate the conductor clock signals CCLK1 and CCLK2, respectively. The manner in which the sound production station 220 generates the conductor clock signal CCLK1 is described in detail below. It is understood that sound production station 230 operates in the same manner to generate the conductor clock signal CCLK2, such that the conductor clock signals CCLK1 and CCLK2 are both synchronized with the full count of conductor clock modulo counter 310.

Figure 7:
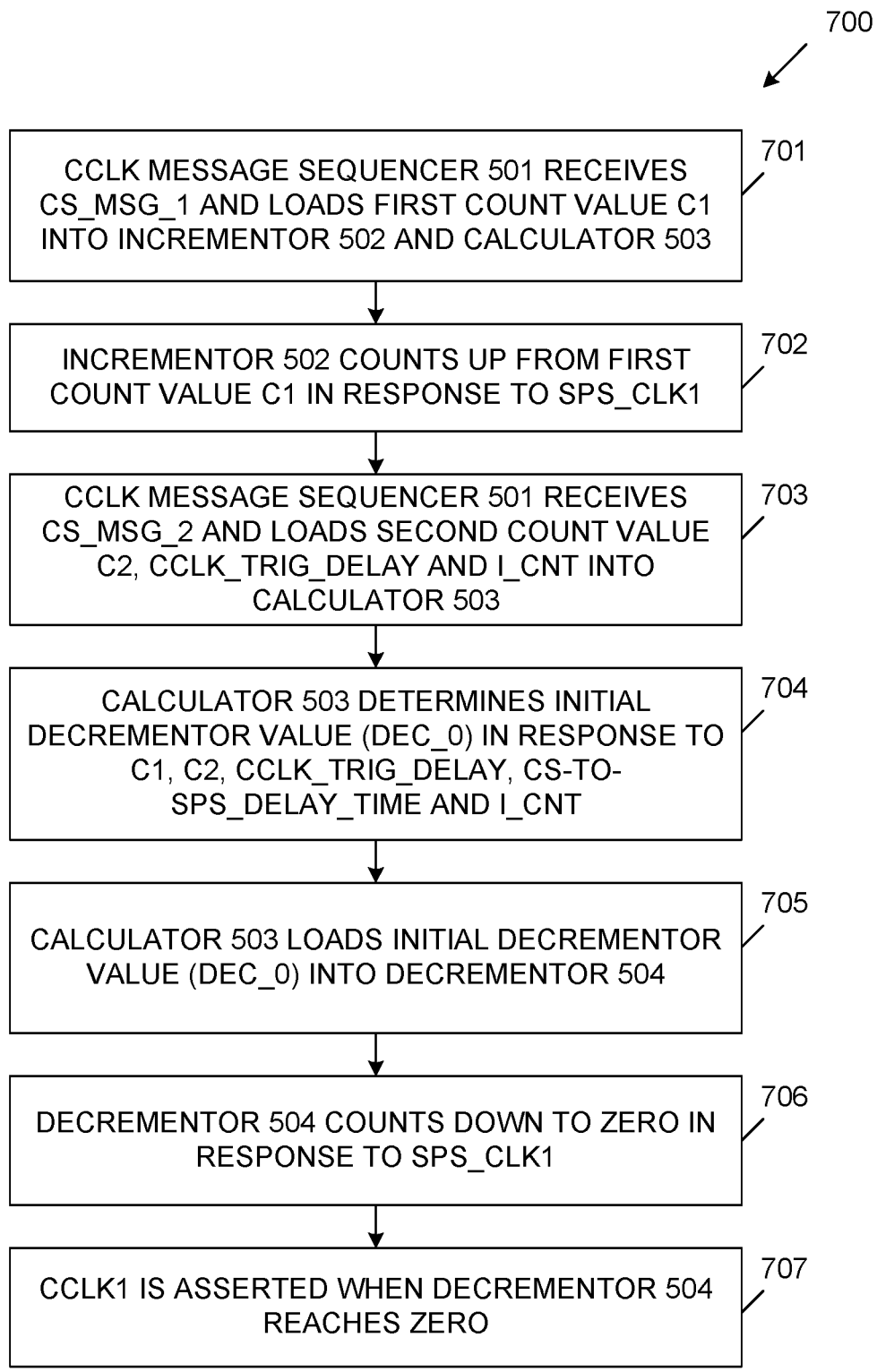
FIG. 7 is a flow diagram illustrating operations performed within the sound production station of FIGS. 4 and 5 to generate a conductor clock signal in accordance with one embodiment of the present invention.

FIG. 7 is a flow diagram 700 illustrating operations performed within sound production station 220 to generate the conductor clock signal CCLK1, in accordance with one embodiment of the present invention.

Conductor clock message sequencer 501 of SPS 220 initially receives the first conductor clock message CC_MSG_1 transmitted on conductor clock message channel 201, and loads the corresponding first counter value C1 into incrementor 502 and CCLK trigger count calculator 503 (Step 701). In the described example, the first counter value C1 is '25'. Incrementor 502 counts up from the first counter value in response to the local SPS_CLK1 signal generated by PLL 225 (Step 702). In the present example, the local SPS_CLK1 signal has a frequency of 200 MHz (although other frequencies are possible). Note that the local SPS_CLK1 signal may have a different frequency than the CS_CLK signal.

Conductor clock message sequencer 501 of SPS 220 subsequently receives the second conductor clock message CC_MSG_2 transmitted on conductor clock message channel 201, and loads the corresponding second counter value C2 (e.g., 425) and CCLK_TRIG_DELAY value (e.g., 575) into conductor clock trigger count calculator 503 (Step 703). Upon receiving the second conductor clock message CC_MSG_2, CCLK message sequencer 501 also causes the CCLK trigger count calculator 503 to latch the current value of incrementor 502 (I_CNT) (Step 703). In the present example, the latched incrementor count value I_CNT is equal to '825' (400 cycles of the CS_CLK signal elapse between receiving messages CC_MSG_1 and CC_MSG_2, and the frequency of the SPS_CLK1 signal is twice the frequency of the CS_CLK signal, such that 800 cycles of the SPS_CLK1 signal elapse between receiving messages CC_MSG_1 and CC_MSG_2). Note that CCLK trigger count calculator 503 also receives CS-TO-SPS_DELAY_TIME value (e.g., 4 microseconds) previously stored in memory 506.

Figure 8:
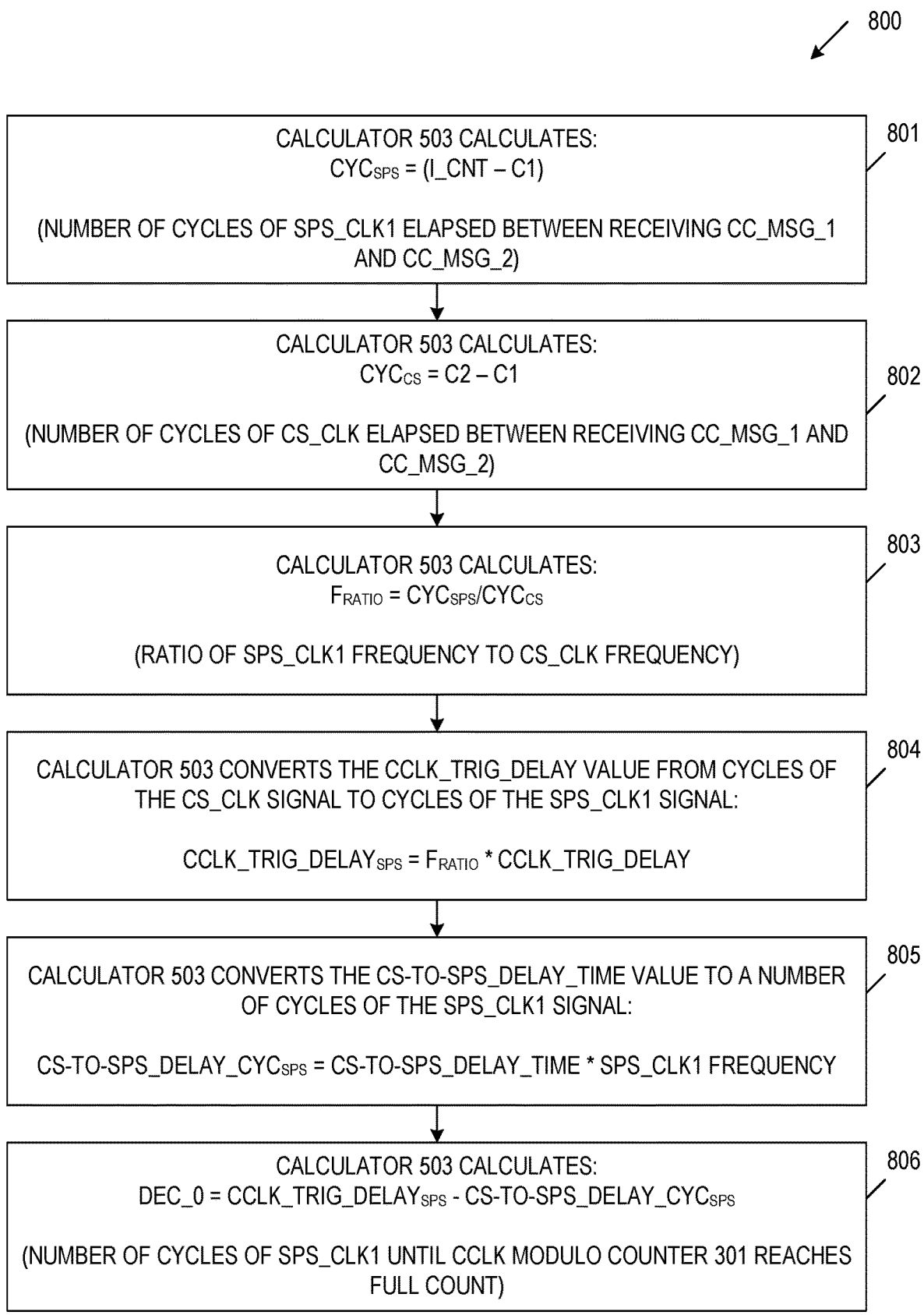
FIG. 8 is a flow diagram illustrating the manner in which the conductor clock trigger count calculator of FIG. 5 determines an initial decrementor value the flow diagram of FIG. 7 in accordance with one embodiment of the present invention.

In response to the above-described received values, CCLK trigger count calculator 503 calculates an initial decrementor value (DEC_0) to be loaded into decrementor 504 (Step 704). FIG. 8 is a flow diagram 800 illustrating the manner in which CCLK trigger count calculator 503 determines the initial decrementor value (DEC_0) in accordance with one embodiment of Step 704. The steps 801-806 of flow diagram 800 are shown in a particular order, to simplify the description of the calculation. However, it is understood that this order can be changed, and/or various calculations can be combined (or performed in parallel) to speed up the determination of the initial decrementor value DEC_0.

In Step 801, CCLK trigger count calculator 503 calculates the number of cycles ($CYC_{SPS}$) of the SPS_CLK1 signal that elapse between receiving the first conductor clock message CC_MSG_1 and receiving the second conductor clock message CC_MSG_2. This calculation is performed by subtracting the latched incrementor count value (I_CNT) from the first counter value (C1). In the described example, $CYC_{SPS}$=(825−25)=800 cycles of the SPS_CLK1 signal.

In Step 802, calculator 503 determines the number of cycles ($CYC_{CS}$) of the CS_CLK signal that elapse between receiving the first conductor clock message CC_MSG_1 and receiving the second conductor clock message CC_MSG_2. This calculation is performed by subtracting the second counter value (C2) from the first counter value (C1). In the described example, $CYC_{CS}$=(425−25)=400 cycles of the CS_CLK signal.

In Step 803, calculator 503 determines the ratio ($F_{RATIO}$) of the frequency of the CS_CLK signal to the frequency of the SPS_CLK1 signal. This calculation is performed by dividing $CYC_{SPS}$ by $CYC_{CS}$. In the described example, $F_{RATIO}$=800/400=2.

In Step 804, calculator 503 converts the CCLK_TRIG_DELAY value from a number of cycles of the CS_CLK signal to a number of cycles of the SPS_CLK1 signal by multiplying the CCLK_TRIG_DELAY value by $F_{RATIO}$. The converted CCLK_TRIG_DELAY value is designated $CCLK\_TRIG\_DELAY_{SPS}$. In the described example, $CCLK\_TRIG\_DELAY_{SPS}$=(575*2)=1150 cycles of the SPS_CLK1 signal.

In Step 805, calculator 503 converts the CS-TO-SPS_DELAY_TIME value from a time value to a number of cycles of the SPS_CLK1 signal by multiplying the CS-TO-SPS_DELAY_TIME value by the frequency of the SPS_CLK1 signal. The converted CS-TO-SPS_DELAY_TIME value is designated $CS\text{-}TO\text{-}SPS\_DELAY\_CYC_{SPS}$. In the described example, $CS\text{-}TO\text{-}SPS\_DELAY\_CYC_{SPS}$=(4 microseconds*200 MHz)=800 cycles of the SPS_CLK1 signal.

In Step 806, calculator 503 determines the number of cycles of the SPS_CLK1 signal that will elapse until the CCLK modulo counter 301 reaches the full count of FULL_CNT. This calculation is performed by subtracting the $CS\text{-}TO\text{-}SPS\_DELAY\_CYC_{SPS}$ value from the $CCLK\_TRIG\_DELAY_{SPS}$ value. This calculated number of cycles is the initial decrementor value DEC_0. In the described example, DEC_0=(1150−800)=350 cycles of the SPS_CLK1 signal.

Returning now to FIG. 7, in Step 705, calculator 503 loads the initial decrementor value DEC_0 (e.g., 350) into decrementor 504. Decrementor 504 counts down from the initial decrementor value DEC_0 in response to the SPS_CLK1 signal (Step 706). The count of decrementor 504 is provided to one input of comparator 505, and the other input of comparator 505 receives a zero value (FIG. 5). When the count of decrementor 504 reaches a zero value (e.g., after 350 cycles of the SPS_CLK1 signal elapse), comparator 505 detects a match and activates an edge of the conductor clock signal CCLK1. This edge of conductor clock signal CCLK1 is used to read digital audio samples from output sample buffer 424 and digital-to-analog converters 425, as described above.

Figure 9:
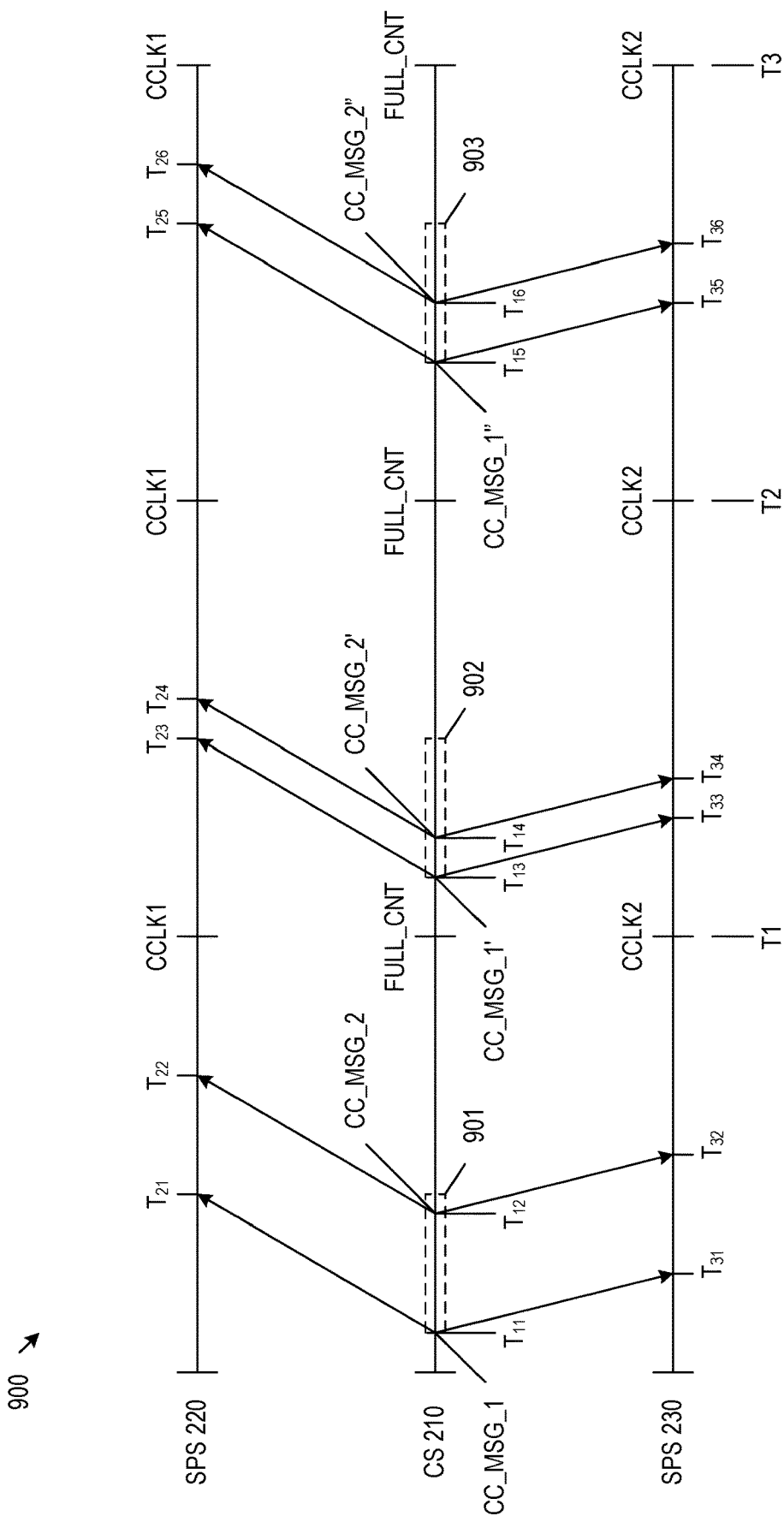
FIG. 9 is a timing diagram that illustrates the transmission of first conductor clock messages and second conductor clock messages by a control station within allocated transmission windows, as well as the receipt of these conductor clock messages within sound production stations, and the generation of local conductor clock signals within the sound production stations, in accordance with one embodiment of the present invention.

FIG. 9 is a timing diagram 900 that illustrates the transmission of first conductor clock messages CC_MSG_1, CC_MSG_1' and CC_MSG_1" (at times $T_{11}$, $T_{13}$ and $T_{15}$, respectively) and the transmission of second conductor clock messages CC_MSG_2, CC_MSG_2' and CC_MSG_2" (at times $T_{12}$, $T_{14}$ and $T_{16}$, respectively) by control station 210 within allocated transmission windows 901, 902 and 903, respectively. The CCLK modulo counter 310 of control station 210 reaches the FULL_CNT value at times T1, T2 and T3.

Timing diagram 900 also shows that SPS 220 receives the first conductor clock messages CC_MSG_1, CC_MSG_1' and CC_MSG_1" at times $T_{21}$, $T_{23}$ and $T_{25}$, respectively, and that SPS 220 receives the second conductor clock messages CC_MSG_2, CC_MSG_2' and CC_MSG_2" at times $T_{22}$, $T_{24}$ and $T_{26}$, respectively. In addition, SPS 230 receives the first conductor clock messages CC_MSG_1, CC_MSG_1' and CC_MSG_1" at times $T_{31}$, $T_{33}$ and $T_{35}$, respectively, and SPS 230 receives the second conductor clock messages CC_MSG_2, CC_MSG_2' and CC_MSG_2" at times $T_{32}$, $T_{34}$ and $T_{36}$, respectively. In the manner described above, sound production stations 220 and 230 will assert active edges of their corresponding conductor clock signals CCLK1 and CCLK2, respectively, at times T1, T2 and T3, in synchronism with the CCLK modulo counter 310 reaching the FULL_CNT value. This synchronism is maintained, even though sound production stations 220 and 230 have different CS-TO-SPS_DELAY_TIME values in the illustrated example (i.e., the transmission delay to SPS 220 (e.g., $T_{21}$-$T_{11}$) is longer than the transmission delay to SPS 230 (e.g., $T_{31}$-$T_{11}$), sound production stations 220 and 230 activate the local conductor clock signals CCLK1 and CCLK2 at the same time that the CCLK modulo counter 310 reaches the FULL_CNT value (e.g., at times T1, T2 and T3). This synchronism is also maintained even though the transmission windows 901-903 are allocated at different intervals within the period defined by CCLK modulo counter 310 in the present example (e.g., $T_{13}$-$T_1$ is less than $T_{15}$-$T_2$). This synchronism is also maintained even though the second conductor clock messages CC_MSG_2, CC_MSG_2' and CC_MSG_2" are transmitted different numbers of clock cycles after the corresponding first conductor clock messages CC_MSG_1, CC_MSG_1' and CC_MSG_1" within the respective transmission windows 901, 902 and 903 (e.g., $T_{12}$-$T_{11}$>$T_{16}$-$T_{15}$>$T_{14}$-$T_{13}$).

Note that if the inherent timing constraints of the system cannot be met (e.g., the CS-TO-SPS_DELAY_TIME values are too long to allow the local conductor clock signals CCLK1 and/or CCLK2 to be generated), then the control station 210 can generate a CS_CLK clock signal having a lower frequency, and the SPSs 220 and 230 can use a local clock multiplier to generate the local conductor clock signals CCLK1 and CCLK2. For example, if the CS-TO-SPS_DE-LAY_TIME is longer than the period of the desired local conductor clock signals CCLK1/CCLK2 (e.g., 10 microseconds for a 100 kHz clock signal), then the modulo counter 310 in the control station 210 is modified to increase the full count value FULL_CNT. Note that full count value FULL_CNT is increased to a value that ensures that the conductor clock messages CC_MSG_1 and CC_MSG_2 are received by the SPSs 220 and 230 prior to the modulo counter 310 becoming full (taking the CS-TO-SPS_DELAY_TIME into account).

In one example, the full count value FULL_CNT is increased (doubled) to a value of 2000. Under these conditions, the SPSs 220 and 230 will generate local conductor clock signals CCLK1 and CCLK2 that have frequencies of 50 kHz (and are synchronized with the full count of modulo counter 310). Local clock multipliers within SPSs 220 and 230 are used to increase the frequency of the local conductor clock signals CCLK1 and CCLK2 to the desired audio sampling frequency. For example, a 2× clock multiplier circuit will increase the 50 kHz local conductor clock signals CCLK1 and CCLK2 to the desired 100 kHz audio sampling clock signals in the above-described examples.

Decoupling the conductor clock message channel 201 from the playback stream message channel 202 in the manner described above advantageously provides improved timing for the playback of audio signals within SPSs 220 and 230.

The present invention addresses the multiple access problem introduced by the use of a shared wireless network (e.g., and 802.11 wireless network) by allowing the playback stream data to be buffered within the sound production stations 220 and 230. As a result, the times at which the playback messages are transmitted do not have to as precise as in a 'just-in-time' system. This is important because the data payload of the playback messages are relatively large, which can result in transmission access delays in a multiple access wireless medium. As described above, the conductor clock messages are relatively short, so it is much easier to ensure that these messages are transmitted using the QoS feature of the multiple access wireless medium. In addition, a little jitter can be tolerated in the conductor clock messages (because it is the delay between the transmission of first and second conductor clock messages that is used to generate the local conductor clock signals in the sound production stations).

Moreover, using a widely deployed standardized wireless technology such as an 802.11 network provides several advantages, including (1) available bandwidth of the 802.11 standard is ever increasing, (2) the availability of components and expertise is readily available and (3) many devices already in the market are compatible with the 802.11 standard.

Although cognitive loudspeaker system 200 can process any playback stream format by installing the appropriate playback executable 423 in each of the sound production stations 220/230, the playback stream format is generally defined by the variants of: (1) time samples, and (2) time-frequency samples.

In the time sample variant, an analog waveform is sampled at a sampling frequency. Each time sample will allow the playback of one sample in a period of the sampling frequency. For example, a 44 kHz sampling frequency will allow the playback of one sample every 22.7 microseconds. Pulse code modulation (PCM) is one example of a time sampling variant.

In one embodiment, cognitive loudspeaker system 200 operates in the following manner when implementing playback stream messages in accordance with the time sample variant. In this embodiment, the conductor clock message channel 201 is implemented by a WiFi channel in accordance with the IEEE 802.11 standard, and the playback stream channel 202 is implemented using powerline Ethernet. The playback stream FIFO 421 within each sound production station is provisioned to store N time samples. The control station 210 transmits the first N time samples to the sound production stations through the playback stream channel 202. After transmitting the first N time samples, the control station 210 starts transmitting the conductor clock messages on conductor clock channel 201, thereby enabling the conductor clock within each sound production station. During each conductor clock period, the control station 210 transmits the next time sample on playback stream channel 202. Because the bandwidth of the playback stream channel 202 (typically on the order of Gb/sec) is much higher than the required bandwidth of the playback stream (typically on the order of Mb/sec), and all of the sound production stations are typically situated in the same room, the probability of a playback message being dropped or delayed beyond the period of the conductor clock signal CCLK1 is very low.

In the time-frequency sample variant, an analog waveform is sampled at a sampling frequency over a timing window that includes a plurality of N time samples. The N time samples are transformed into N frequency samples using a transform algorithm (e.g., a modified cosine transform). Typically, a lossy compression will be performed to lower the bit rate required to transport the data. To play back the audio stream, the sound production station performs the inverse transform on the N frequency samples to reconstruct the N timing samples. Each time-frequency sample will allow the playback of N samples during a period equal to N*the period of the sampling frequency. For example, if the timing window includes 1024 samples and the sampling frequency is 44 kHz, then playback of these 1024 samples will occur over a period of 23 milliseconds (1024*22.7 microseconds).

In one embodiment, cognitive loudspeaker system 200 operates in the following manner when implementing playback stream messages in accordance with the time-frequency sample variant. In this embodiment, the conductor clock message channel 201 is implemented by a UWB interface, and the playback stream channel 202 is implemented by a WiFi channel in accordance with the IEEE 802.11 standard. The control station 210 initially requests the bandwidth of the required bit rate to transport the time-frequency playback samples, as well as the opportunity to transmit these time-frequency playback samples within a transmit window from the 802.11 networks in the area. The playback stream FIFO 421 within each sound production station is provisioned to store the first N time-frequency samples. The control station 210 transmits the first N time-frequency samples to the sound production stations during the allocated transmit window. After transmitting the first N time-frequency samples, the control station 210 starts transmitting the conductor clock messages on conductor clock channel 201, thereby enabling the conductor clock within each sound production station. During each allocated transmit window, the control station 210 transmits the next set of time-frequency samples on playback stream channel 202. An additional flow control mechanism is available for the control station 210 to control the flow of the time-frequency samples. If the allocated bandwidth is relatively low and/or the allocated transmit window is relatively short, then the control station 210 can apply a more aggressive level of compression to reduce the bit rate of the time-frequency samples. In this case, the control station 210 can transmit multiple lower bit rate time-frequency samples within the allocated transmit window.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

I claim:

1. A system comprising:
a control station that transmits clock control messages and separate playback messages, wherein the clock control messages are generated in response to a first clock signal within the control station; and
a first sound production station (SPS) that receives the clock control messages and the playback messages, wherein the first SPS includes:
a first clock generation circuit that generates a first local conductor clock signal in response to the received clock control messages and a first SPS clock signal generated within the first SPS,
a first playback processor that generates first digital playback samples in response to the received playback messages, and
a first memory that receives and stores the first digital playback samples from the first playback processor, in response to the first SPS clock signal, wherein the first memory outputs the first digital playback samples are read out of the first memory in response to the first local conductor clock signal,
wherein the control station further comprises a counter having a count that cyclically changes from an initial count value to a final count value in response to the first clock signal, wherein a time required to count from the initial count value to the final count value corresponds with a period of the first local conductor clock signal.

2. The system of claim 1, further comprising a first communication channel for transmitting the clock control messages and a second communication channel, separate from the first communication channel, for transmitting the playback messages.

3. The system of claim 2, wherein the first communication channel comprises a first wireless communication channel.

4. The system of claim 3, wherein the second communication channel comprises a second wireless communication channel.

5. The system of claim 3, wherein the second communication channel comprises a powerline Ethernet channel.

6. The system of claim 1, wherein the clock control messages and the playback messages are transmitted at different times on a common wireless communication channel.

7. The system of claim 1, wherein the first local conductor clock signal is synchronized to the first clock signal.

8. The system of claim 1, further comprising a second SPS that receives the clock control messages and the playback messages, wherein the second SPS includes:
a second clock generation circuit that generates a second local conductor clock signal in response to the received clock control messages and a second SPS clock signal generated within the second SPS,
a second playback processor that generates second digital playback samples in response to the received playback messages, and
a second memory that receives and stores the second digital playback samples from the second playback processor in response to the second SPS clock signal, wherein the second memory outputs the second digital playback samples in response to the second local conductor clock signal.

9. The system of claim 8, wherein the first digital playback samples are different than the second digital playback samples.

10. The system of claim 1, wherein the clock control messages include:
   a first clock control message that includes a first count value (C1) of the counter, wherein the first count value indicates when the first clock control message is transmitted, and
   a second clock control message that includes a second count value (C2) of the counter, wherein the second count value indicates when the second clock control message is transmitted, and a third count value (C3) that specifies a difference between the second count value and the final count value of the counter.

11. The system of claim 10, wherein the first clock generation circuit includes circuitry that generates the first local conductor clock signal in response to the first, second and third count values.

12. The system of claim 10, wherein the first clock generation circuit includes an incrementor that is loaded with the first count value, and counts from the first count value in response to the first SPS clock signal, until the first SPS receives the second clock control message, wherein the count of the incrementor is latched as an incremented count value (I_CNT) when the first SPS receives the second clock control message.

13. The system of claim 12, wherein the first clock generation circuit includes circuitry for determining a transmission delay (CS-TO-SPS_DELAY_CYC$_{SPS}$) of the playback messages from the control station to the first SPS, in units of cycles of the first SPS clock signal.

14. The system of claim 13, wherein the first clock generation circuit includes a calculation unit that uses the first count value, the second count value, the third count value, the incremented count value and the transmission delay to calculate a number of cycles (DEC_0) of the first SPS clock signal until the final count value of the counter is reached.

15. The system of claim 14, wherein the calculation unit calculates the number of cycles using the following equation:

$$DEC\_0 = C3*((I\_CNT-C1)/(C2-C1))-CS\_TO\_SPS\_DELAY_{SPS}.$$

16. The system of claim 15, wherein the first clock generation circuit further includes a decrementor, wherein the decrementor is loaded with the calculated number of cycles DEC_0, and counts down in a zero count in response to the first SPS clock signal.

17. The system of claim 16, further comprising a circuit that asserts the first local conductor clock signal in response to the decrementor reaching a zero count.

18. A method comprising:
   broadcasting clock control messages and separate playback messages from a control station to a plurality of sound production stations, wherein the clock control messages are generated in response to a first clock signal within the control station;
   generating a local conductor clock signal within each of the sound production stations in response to the clock control messages and a local SPS clock signal generated within each of the sound production stations;
   implementing a counter in the control station having a count that cyclically changes from an initial count value to a final count value in response to the first clock signal, wherein a time required to count from the initial count value to the final count value corresponds with a period of the local conductor clock signals;
   generating digital playback samples in each of the sound production stations in response to the playback messages;
   storing the digital playback samples generated in each of the sound production stations in response to the local SPS clock signal; and
   retrieving the stored digital playback samples in each of the sound productions stations in response to the local conductor clock signal.

19. The method of claim 18, wherein broadcasting the clock control messages includes:
   transmitting a first clock control message that includes a first count value (C1) of the counter, wherein the first count value indicates when the first clock control message is transmitted, and
   transmitting a second clock control message that includes a second count value (C2) of the counter, wherein the second count value indicates when the second clock control message is transmitted, and a third count value (CCLK_TRIG_DELAY) that specifies a difference between the second count value and the final count value of the counter.

20. The method of claim 19, wherein generating the local conductor clock signal within each of the sound production stations comprises performing the following operation in each of the sound production stations:
   counting from the first count value using the local SPS clock signal until the sound production station receives the second clock control message, thereby generating a local incremented count value (I_CNT) when the sound production station receives the second clock control message.

21. The method of claim 20, wherein generating the local conductor clock signal within each of the sound production stations comprises performing the following operation in each of the sound production stations:
   determining a transmission delay (CS-TO-SPS_DELAY_CYC$_{SPS}$) of the playback messages from the control station to the sound production station, in units of cycles of the first SPS clock signal.

22. The method of claim 21, wherein generating the local conductor clock signal within each of the sound production stations comprises performing the following operation in each of the sound production stations:
   using the first count value, the second count value, the third count value, the local incremented count value and the transmission delay to calculate a number of delay cycles (DEC_0) of the local SPS clock signal that must elapse until the final count value of the counter is reached.

23. The method of claim 22, wherein the number of delay cycles is calculated using the following equation in each of the sound production stations:

$$DEC\_0 = ((I\_CNT-C1)/(C2-C1)*C3) - CS\text{-}TO\text{-}SPS\_DELAY\_CYC_{SPS}.$$

24. The method of claim 22, further comprising performing the following operations within each sound production station:
   counting the number of delay cycles calculated within the sound production station using the local SPS clock signal; and asserting the local conductor clock signal in the sound production station in response to counting the number of delay cycles.

\* \* \* \* \*